A. S. HOSLEY.
Measuring Gage.
No. 8,307. Patented Aug. 19, 1851.
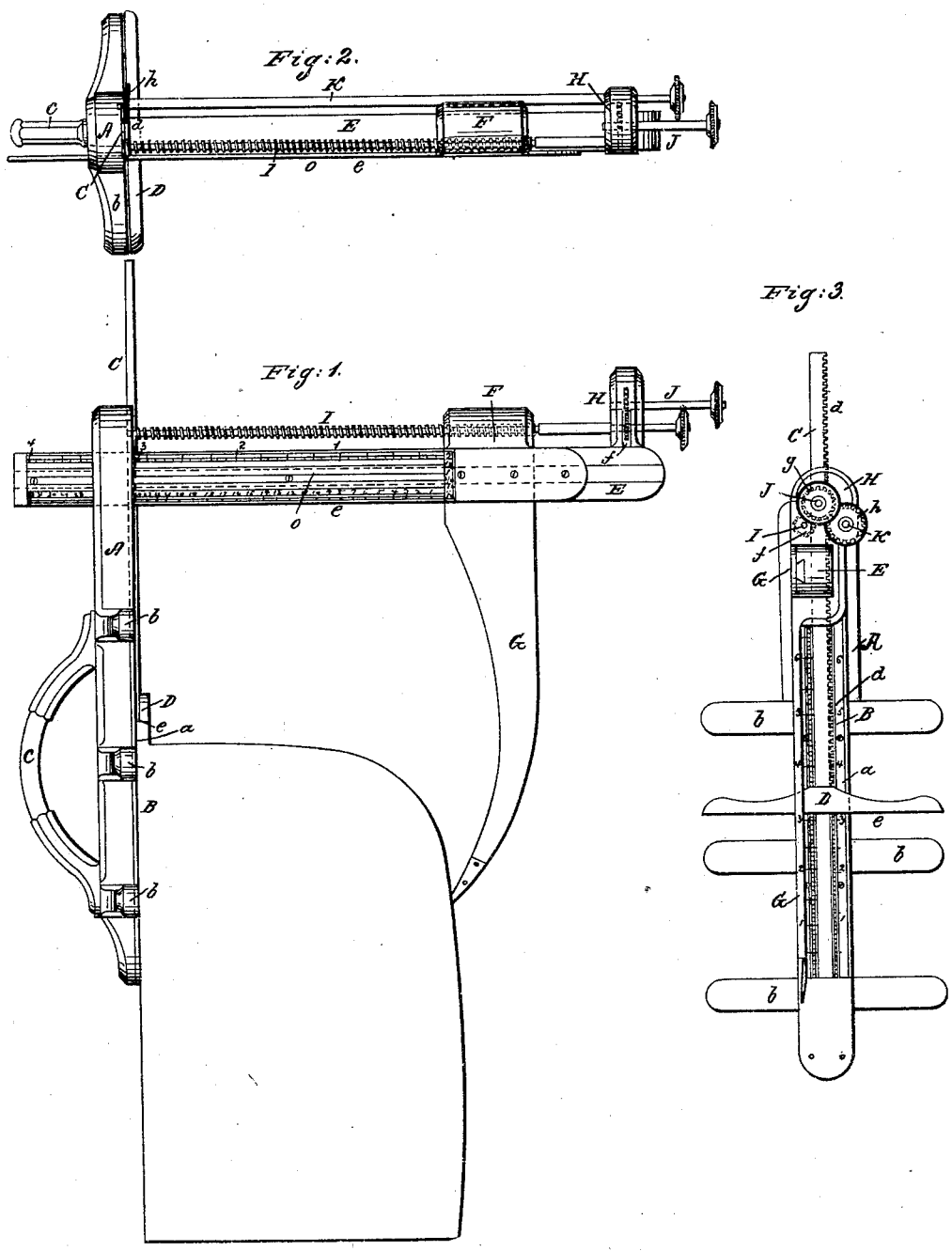

UNITED STATES PATENT OFFICE.

ABIJAH S. HOSLEY, OF NEW YORK, N. Y.

SHIP'S-MODEL MEASURER.

Specification of Letters Patent No. 8,307, dated August 19, 1851.

*To all whom it may concern:*

Be it known that I, ABIJAH S. HOSLEY, of the city, county, and State of New York, have invented a new and useful Instrument for Taking the Dimensions of Models of Ships and other Vessels, which I term the Ship's Model Measurer; and I do hereby declare that the following is a full, clear, and exact description of the same, reference being had to the accompanying drawings, forming part of this specification, in which—

Figure 1, is a front view of the instrument showing it applied to a model of which a transverse section is represented. Fig. 2, is a top view, and fig. 3, is a side view.

Similar letters of reference indicate corresponding parts in each of the several figures.

My invention consists in an upright pillar or post having a stationary arm on one side standing at a right angle to it. On the side of the pillar to which the arm is attached, there is a graduated rule or scale, divided into any number of equal parts representing any measurement according to the scale of the model; and through or upon the said scale there passes an upright sliding rod having a straight edge rest at its lower end set at right angles to it; the sliding rod is intended to be adjusted at any height on the pillar so as to bring the straight edge of the rest to any height on the scale by a rack and pinion, a screw, or other suitable means. On the arm there is fitted a sliding headstock carrying a leg resembling one side of a pair of calipers and to this headstock is attached a rule on which there may be any suitable number of scales of equal parts varying in the proportion which they bear to a foot or other standard measurement. The headstock is moved along the arm by a screw or other device equivalent thereto, and the rule slides through the pillar. By placing the straight edge of the rest on the keel of the model the pillar resting against the midship section and moving it and the sliding headstock and leg so as to bring the point of the leg to any point on the model, the proportion which the dimensions of the model bear to those of the vessel it represents, being determined or known, the precise dimensions of the vessel at that point may be ascertained, and by taking the measurement of the model at a great number of points, the ship builder will obtain the necessary measurements to enable him to construct a vessel, in a much shorter time than they could be obtained by other means.

To enable others skilled in the art to make and use my invention I will proceed to describe its construction and operation.

A, represents the pillar or post which I construct of hard wood or any suitable material, its face $a$, has a plane surface; cross pieces $b$, are attached to it whose faces are flush with $a$, giving it a broader bearing surface; it has a handle $c$, opposite to its face $a$, by which it is held.

B, is the rule or scale on the face $a$, it is divided into inches, and again subdivided, each division representing any measurement on the vessel represented by the model acording to the proportion, between them.

C, is the sliding rod, which fits in a suitable dovetailed rabbet in the face of the pillar and has a toothed rack $d$, upon it standing outside the pillar.

D, is the straight edged rest attached to the bottom of C, its lower edge $e$, has a perfectly plane surface standing at right angles to the plane $a$, on the pillar and also to the sliding edges of the rod C.

E, is the arm which is made of the same material as the pillar and secured firmly to it, its upper and lower sides are parallel; and at right angles to the face $a$, forming a slide on which the headstock travels.

F, is the headstock carrying the leg G, both being made in one piece, the headstock is fitted so as to slide freely on the arm E, and the point $i$, of the leg is shod with ivory or other hard material.

O, is the rule or scale which is attached to the headstock, covering one side of the arm E, and having a dovetailed slide at its back fiting in a rabbet in the arm, its face has a number of scales upon it, varying from $\frac{1}{4}$ of an inch to 2 inches to the foot, these may be varied in any suitable manner and there may be any number of them; the number of their divisions commencing at the end farthest from the pillar at a point in a line with the point $i$, of the leg G, (*id est*,) a line drawn from the commencement of the scales to the point $i$, of the leg, will be parallel to the face $a$, of the pillar. The rule passes through a slot in the pillar.

H, is a small hollow standard secured on the top of the arm E, near its end.

I, is a long screw, which fits in a female screw or nut in the top of the headstock. F, it has journals fitting in the pillars A, and in the standard H, and hangs parallel to the arm, carrying a small toothed wheel $f$.

J, is a small spindle, fitting in bearings in the standard H, and carrying a toothed wheel $g$, larger than $f$, and gearing with it.

K, is a spindle fitting in bearings in the pillar A, and standard H, and carrying a small toothed pinion $h$, gearing into the teeth of the rack.

The mode in which the process of measuring is conducted is as follows. The model to be measured is turned bottom upwards, or placed in any other convenient position, and the face $a$, is placed against its midship section, with the edge $e$, of the rest D, resting on the keel. It is necessary in order to get the lines of the vessel correct to take the width or distance from the center line at a great many points of elevation on vertical lines, and at a great many points on horizontal lines or technically speaking to take the width at every lift on each frame. Suppose that the measurements is commenced from the keel on any frame of a vessel; by turning the spindle K, the rack $d$, may be operated so as to bring the pointer at a suitable elevation above the keel to take the first measurement, the sliding headstock is then, by turning spindle J, so as to make the screw I, turn in the proper direction, caused to move along the arm E, till the point $i$, of the leg G, touches the model; by referring to the scale on the rule O, which represents the proportion the model bears to the vessel to be built, the distance from the center line may be read off at the point where the rule meets the face $a$, of the pillar which represents the vessels center line; this being noted the dimensions may be taken by the same means at any given distance above by altering the position of the edge of the rest on the pillar, and by proceeding by certain stated distances upwards, the dimensions or distance from the center line of a number of points on the frame may be obtained, and by setting them out and drawing lines through them the precise form of the frame is given. The form of the vessel on any line taken longitudinally may be obtained in the same way, by moving the instrument along the keel and taking the dimensions at a given number of points on one line without altering the position of the rest on the pillar.

A vessel of any size may be laid down from a model by the aid of this measurer, according to which of the scales on the rule O, be employed and though the model may be that of a small vessel, should its sailing qualities be such as are desired, by varying the scale, a larger one may be built of precisely the same form.

The principal advantage of this measurer is that the dimensions of any vessel can be obtained by it from a model, with greater accuracy and with greater speed and facility than they can by the ordinary mode of measuring.

What I claim as new in my invention and desire to secure by Letters Patents, is—

The employment for the purpose of taking the dimensions of models of ships and all other vessels, of a pillar or post A, having a graduated scale B, on one side and an adjustable rest D, sliding on it, and having also a rule O with any number of graduated scales on its face and a leg G, connected with it, both the rule and leg being capable of adjustment in lines at right angles to the face of the pillar or post, the whole being constructed arranged and operated in the manner substantially as set forth.

ABIJAH S. HOSLEY.

Witnesses:
R. W. FENWICK,
EL. POLHAMUS.